(12) United States Patent
Kane

(10) Patent No.: US 12,654,616 B2
(45) Date of Patent: Jun. 16, 2026

(54) MULTI-LEVEL WARNING BASED ON DRIVER GAZE

(71) Applicant: Cerence Operating Company, Burlington, MA (US)

(72) Inventor: Mark Kane, Burlington, MA (US)

(73) Assignee: Cerence Operating Company, Burlington, MA (US)

( * ) Notice: Subject to any disclaimer, the term of this patent is extended or adjusted under 35 U.S.C. 154(b) by 66 days.

(21) Appl. No.: 18/655,474

(22) Filed: May 6, 2024

(65) Prior Publication Data

US 2024/0391382 A1 Nov. 28, 2024

Related U.S. Application Data

(60) Provisional application No. 63/468,608, filed on May 24, 2023.

(51) Int. Cl.
B60Q 9/00 (2006.01)

(52) U.S. Cl.
CPC ..................................... B60Q 9/00 (2013.01)

(58) Field of Classification Search
CPC . B60W 2510/0623; B60W 2510/0647; B60W 2510/0657; B60W 2510/0676; B60W 2510/1015; B60W 2510/1025; B60W 2510/104; B60W 2510/105; B60W 2510/107; B60W 2510/20; B60W 2520/00; B60W 2520/125; B60W 2520/16; B60W 2530/213; B60W 2540/045; B60W 2540/12; B60W 2540/14; B60W 2540/20; B60W 2540/229; B60W 2710/0655; B60W 2710/0677; B60W 2710/10; B60W 2710/1061; B60W 2754/30; B60W 2754/50; B60W 30/06; B60W 30/18018; B60W 30/18136; B60W 30/1882; B60W 30/20; B60W 40/00; B60W 50/023; B60W 50/029; B60W 50/04; B60W 60/00186; B60W 60/00276; B60W 60/0054; B60W 10/024; B60W 10/24; B60W 2050/0025; B60W 2050/0052; B60W 2540/106; B60W 2540/225; B60W 2540/227; B60W 2556/05; B60W 2556/30; B60W 30/025; B60W 30/165; B60W 30/18027; B60W 30/18036; B60W 30/18181; B60W 30/1819; B60W 40/107; B60W 50/045;

(Continued)

(56) References Cited

U.S. PATENT DOCUMENTS 10,970,746 B2 * 4/2021 Singhal ................. B60W 10/06
2009/0299857 A1 * 12/2009 Brubaker ............... G06Q 30/02
                                                            455/99

(Continued)

FOREIGN PATENT DOCUMENTS

EP              2755192 A1    7/2014

*Primary Examiner* — Daniel Previl
(74) *Attorney, Agent, or Firm* — Burr & Forman

(57) ABSTRACT

A method for providing a driver with a warning includes determining that a vehicle is being operated in a manner that fails to comply with a constraint imposed on motion of vehicles on a section of a road, determining that a driver of the vehicle is gazing in a non-neutral direction, based on having done so, selecting a level of obtrusiveness for the warning message, and outputting the warning message at that level.

20 Claims, 3 Drawing Sheets

(58) Field of Classification Search
CPC ............. B60W 50/14; B60W 2552/53; B60W 2555/60; B60W 2556/50; B60W 2040/0809; B60W 2040/0818; B60W 2050/0029; B60W 2050/0071; B60W 2050/0215; B60W 2520/10; B60W 2520/105; B60W 2540/043; B60W 2540/215; B60W 2540/30; B60W 2552/05; B60W 2554/406; B60W 2556/10; B60W 2556/65; B60W 30/18163; B60W 40/08; B60W 40/09; B60W 50/0205; B60W 50/0225; B60W 50/06; B60W 60/0015; B60W 60/0051; B60W 10/11; B60W 10/184; B60W 10/20; B60W 2040/0872; B60W 2420/403; B60W 2420/408; B60W 2510/1005; B60W 2540/00; B60W 2540/16; B60W 2540/18; B60W 2554/404; B60W 30/00; B60W 30/18054; B60W 2540/22; B60W 30/146; B60W 50/12; G06V 20/588; G06V 20/56; G06V 20/58; G06V 20/584; G06V 20/582; G06V 20/64; G06V 20/63; G06V 10/82; G06V 20/597; G06V 10/764; G06V 2201/08; G06V 10/44; G06V 10/772; G06V 10/40; G06V 10/762; G06V 2201/07; G06V 40/103; G06V 10/25; G06V 10/454; G06V 20/44; G06V 20/59; G06V 20/46; G06V 40/1365; G06V 40/18; G06V 40/70; G06V 10/462; G06V 10/811; G06V 20/20; G06V 10/75; G06V 10/774; G06V 20/176; G06V 20/39; G06V 20/647; G06V 20/70; G06V 40/16; G06V 2201/10; G06V 10/7788; G06V 10/98; G06V 20/182; G06V 30/422; G06V 40/12; G06V 10/806; G06V 10/987; G06V 20/586; G06V 40/28; G06V 10/143; G06V 10/147; G06V 10/16; G06V 10/758; G06V 10/771; G06V 10/7747; G06V 10/776; G06V 10/778; G06V 10/80; G06V 10/85; G06V 10/895; G06V 10/95; G06V 20/10; G06V 20/13; G06V 20/38; G06V 20/625; G06V 30/1916; G06V 30/19173; G06V 30/274; G06V 40/10; G06V 40/174; G06V 10/225; G06V 10/255; G06V 10/26; G06V 10/50; G06V 10/513; G06V 10/56; G06V 10/62; G06V 10/74; G06V 10/751; G06V 10/803; G06V 10/993; G06V 20/54; G06V 20/60; G06V 40/168; G06V 40/172; G06V 40/161; G06V 40/171; G06V 30/413; G06V 40/162; G06V 40/165; G06V 40/166; G06V 10/761; G06V 10/00; G06V 20/00; G06V 30/00; G06V 40/00; G06V 2201/00; G05D 1/0088; G05D 1/0246; G05D 1/0278; G05D 1/0221; G05D 1/0287; G05D 1/0212; G05D 1/0251; G05D 1/0253; G05D 1/0219; G05D 1/0274; G05D 1/249; G05D 1/0214; G05D 1/81; G05D 1/248; G05D 1/0276; G05D 1/692; G05D 1/617; G05D 1/0231; G05D 1/246; G05D 1/0223; G05D 1/0061; G05D 1/227; G05D 1/2435; G05D 1/646; G05D 1/021; G05D 1/0285; G05D 1/0257; G05D 1/0055; G05D 1/0077; G05D 1/028; G05D 1/24; G05D 1/0297; G05D 1/247; G05D 1/0217; G05D 1/0238; G05D 1/0248; G05D 1/0291; G05D 1/87; G05D 1/0011; G05D 1/0027; G06F 3/013; G06F 21/32; G06F 16/9538; G06F 16/9577; B62D 6/008; B62D 6/003; B62D 15/025; B62D 15/0285; B62D 25/04; B62D 29/04; B62D 29/043; B62D 5/008; B62D 5/04; B62D 5/0463; B62D 5/0472; B62D 6/001; B62D 6/002; H04N 23/611; H04N 23/64; H04N 23/80; H04N 7/188; B60Q 1/525; B60Q 1/46; B60Q 9/008; B60Q 1/50; B60Q 1/5035; B60Q 1/549; B60Q 9/00; G01C 21/30; G01C 21/3641; G01C 21/3658; G07C 9/37; G08B 21/06; G08B 21/0476; G08G 1/166; G08G 1/052; G08G 1/09623; G08G 1/09626; B60J 1/004; B60J 1/02; B60J 1/06; B60R 2300/30; B60R 2300/804; B60T 2201/10; B61L 13/00; B61L 15/0072; F16H 61/16; F16H 61/18; G06Q 30/0283; G06Q 40/08; G06Q 30/0201; G06Q 30/0251; G06Q 30/0282; G06T 17/20; G06T 2207/10048; G06T 2207/20081; G06T 7/70; A61B 5/18
USPC ........ 340/576, 588, 636.11, 641, 683, 686.1, 340/691.6, 692, 3.1, 3.43, 825.29, 5.32, 340/7.31, 7.51
See application file for complete search history.

(56)                    References Cited

U.S. PATENT DOCUMENTS

| | | | |
|---|---|---|---|
| 2015/0102929 A1* | 4/2015 | Grinenval | B60K 28/066 |
| | | | 340/576 |
| 2016/0009175 A1 | 1/2016 | Mcnew | |
| 2016/0049076 A1 | 2/2016 | Waite | |
| 2017/0043715 A1 | 2/2017 | Osugi | |
| 2017/0120749 A1* | 5/2017 | Dias | G09G 3/20 |
| 2021/0142526 A1* | 5/2021 | Mantyjarvi | B60W 60/001 |
| 2021/0197720 A1* | 7/2021 | Houston | G06N 3/045 |
| 2021/0374391 A1* | 12/2021 | Jorasch | G06V 40/19 |
| 2021/0397859 A1 | 12/2021 | Arora et al. | |
| 2022/0111867 A1* | 4/2022 | Trask | B60W 40/09 |
| 2022/0126878 A1* | 4/2022 | Moustafa | B60W 60/0013 |

* cited by examiner

MULTI-LEVEL WARNING BASED ON DRIVER GAZE

CROSS-REFERENCE TO RELATED APPLICATIONS

This application claims the benefit of the May 24, 2023 filing date of U.S. Provisional Application No. 63/468,608, the content of which is hereby incorporated by reference in its entirety.

BACKGROUND

Different segments of a road often have different speed limits. A driver may not be aware of when a speed limit has changed. As a result, a driver may inadvertently drive at a speed higher than that permitted.

It is useful to provide a warning to the driver who is driving in a manner that does not comply with the speed limit. Known methods of providing such warnings rely on the speed of the vehicle and the speed limit at the vehicle's location.

SUMMARY

In one aspect, the invention includes determining that a vehicle is being operated in a manner that fails to comply with a constraint imposed on motion of vehicles on a section of a road, determining that a driver of the vehicle is gazing in a direction other than a neutral direction, based on having determined that the driver is gazing in the non-neutral direction, selecting a level of obtrusiveness for the warning message, and outputting the warning message at that selected level.

Some practices include those in which the constraint is a speed limit.

Other practices include selecting the level based on an extent to which a direction in which the driver is gazing differs from the neutral direction.

In still other practices, determining that a driver of the vehicle is gazing in a direction other than the neutral direction comprises making the determination based at least in part on a signal from a camera that is pointing at the driver.

Further practices include those in which determining the constraint based at least in part on observations of signage by an external camera and those in which determining the constraint is based at least in part on a GPS signal.

In yet other practices, selecting a level of obtrusiveness for the warning message based at least in part on having determined that the driver is gazing in the non-neutral direction comprises selecting said level based at least in part on the driver having been gazing in the non-neutral direction for a time in excess of a pre-selected threshold.

In another aspect, the invention features a warning system for a vehicle. The warning system comprises an escalator and a level selector. The level selector receives a constraint signal, a motion signal, and a gaze signal. The constraint signal is indicative on a constraint on motion of a vehicle on a section of a road. The motion signal is indicative of the vehicle's motion of the vehicle. The gaze signal is indicative of whether a driver is gazing in a direction other than a neutral direction. The level selector is configured to select a level of obtrusiveness of a warning signal based at least in part on the gaze signal. The escalator then receives the level from the level selector and outputs a warning signal based on the level.

Embodiments include those that also comprise a GPS that maintains a library of constraints for specific locations, uses the vehicle's location to choose a constraint from the library, and provides the constraint signal that communicates the constraint to the warning system.

Other embodiments include a gaze detector that produces a signal that is indicative of an extent to which the driver has deviated from a neutral gaze.

Still other embodiments include those in which the warning system further comprises a multiplexer that selects the constraint signal from among a plurality of sources of constraint signals.

Also among the embodiments are those in which the level selector is further configured to select the level of obtrusiveness based on the deviation from the neutral gaze and those in which the level selector is further configured to select the level of obtrusiveness based on an observed pattern in the driver's gaze direction, the pattern comprising two or more instances of the driver gazing in a direction other than the neutral direction.

Still other embodiments include user preferences to enable the driver to selectively disable the warning system.

Some embodiments include a camera, a GPS that maintains a library of constraints that are keyed to vehicle location and that provides a first constraint signal based on the vehicle's location, user preferences that control operation of the warning system, a motion sensor that provides, to the warning system, indicative of the vehicle's speed to the level selector, and a gaze detector that provides, to the level selector, a signal indicative whether the driver is in a neutral state or in a non-neutral state, wherein the warning system further comprises a feature extractor that extracts constraint information from one or more images provided by the camera and a multiplexer that receives a second constraint signal from the feature extractor and a first constraint signal from the GPS and that chooses which of the first and second constraint signals to provide to the level selector.

Also among the embodiments are those that have been configured to define a neutral direction as being a direction through a windshield of the vehicle such that, in the neutral direction, a field-of-view of the driver includes a speedometer of the vehicle and an instrument panel of the vehicle.

Still other embodiments include those in which, wherein, during an interval in which the vehicle's motion fails to comply with the constraint on the motion, the escalator outputs plural warning signals one after the other. These plural warning signals include one or more of: a flashing light on an instrument panel of the vehicle, an audible alert, a combination of a flashing light on the instrument panel and an audible alert, and a haptic signal.

Embodiments also include those in which the escalator outputs the warning signal only if motion of the vehicle fails to comply with the constraint on the motion and those in which the escalator outputs a null warning signal when the vehicle's motion complies with the constraint.

Also among the embodiments are those in which the escalator outputs a first warning signal followed by a second warning signal. In such embodiments, there exists both a probability that the driver will notice the first warning signal and a probability that the driver will notice the second warning signal, the latter being greater than the former.

These and other features of the invention will be apparent from the following detailed description and the accompanying figures, in which:

DETAILED DESCRIPTION

Figure 1:
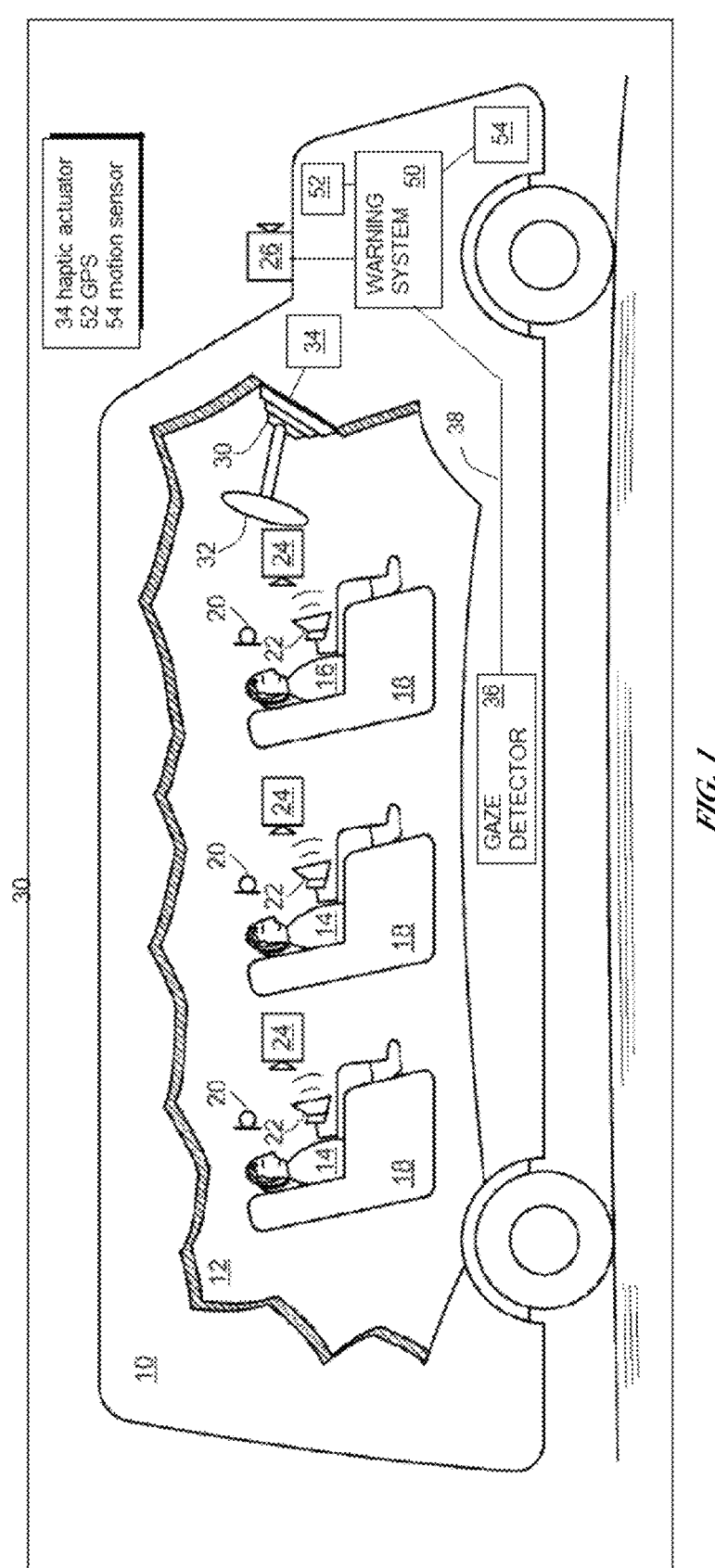
FIG. 1 shows a vehicle having a warning system incorporated therein.

FIG. 1 shows a vehicle 10 having a passenger cabin 12 in which passengers 14 and a driver 16 sit in seats 18. Each seat 18 has an associated microphone 20, a speaker 22, and an internal camera 24. The internal cameras 24 are directed towards various portions of the cabin 12. The vehicle 10 also includes external cameras 26. The external cameras 26 are directed towards the vehicle's environment.

The driver 16 faces an instrument panel 28 having a speedometer 30 integrated therein. In addition, the driver 16 has a steering wheel 32 for use in controlling the vehicle's direction. A haptic actuator 34 couples to one or more structures that, when vibrated or otherwise made to move, will attract the driver's attention. In the illustrated embodiment, the haptic actuator 34 couples to the steering wheel 32.

In the course of driving, a driver 16 spends much of the time gazing forward through the vehicle's windshield. This direction will be referred to herein as the "neutral direction."

When the driver gazes in the neutral direction, the driver's field-of-view includes the instrument panel 28, and in particular, the speedometer 30. This makes it possible for the driver 16 to observe any visual warnings delivered via the instrument panel 28. Many warnings are delivered this way. Examples include a blue light indicating that high beams are on, a light for low fuel, a light indicating that the handbrake is engaged, a light indicating one's seat belt is not fastened, and various other lights whose meanings are often sufficiently obscure to require consulting the vehicle's manual.

As one drives, it is natural and indeed proper for one's gaze to shift away from the neutral direction. After all, it is hardly safe to drive a car while staring at the instrument panel 28 instead of at the road ahead. Thus, there may be extended periods during which the driver does not observe the instrument panel 28. During these periods, the driver will not be able to observe warnings delivered via the instrument panel 28. It is therefore useful to recognize the driver's gaze direction as a function of time to identify extended periods during which the driver has not looked at the instrument panel so that warnings that might otherwise be missed can be delivered in a way that will allow them to be recognized.

To promote the ability to do so, the vehicle 10 further includes a gaze detector 36 that receives inputs from the particular internal camera 24 and microphone 20 that are best situated to observe the driver 16. Based on features present in those inputs, the gaze detector 36 outputs a gaze signal 38. Embodiments include those in which the gaze signal 38 depends on head movement, eye movement, or a combination of both head and eye movement.

Based on this gaze signal 38, it is possible to determine the driver's gaze direction. Armed with this information, it is possible to infer that a driver 16 may not notice a warning signal, either because the instrument panel 28 is not in the driver's field-of-view or because it is at the edge of the driver's field-of-view, where the eye's resolution is poorest.

Figure 2:
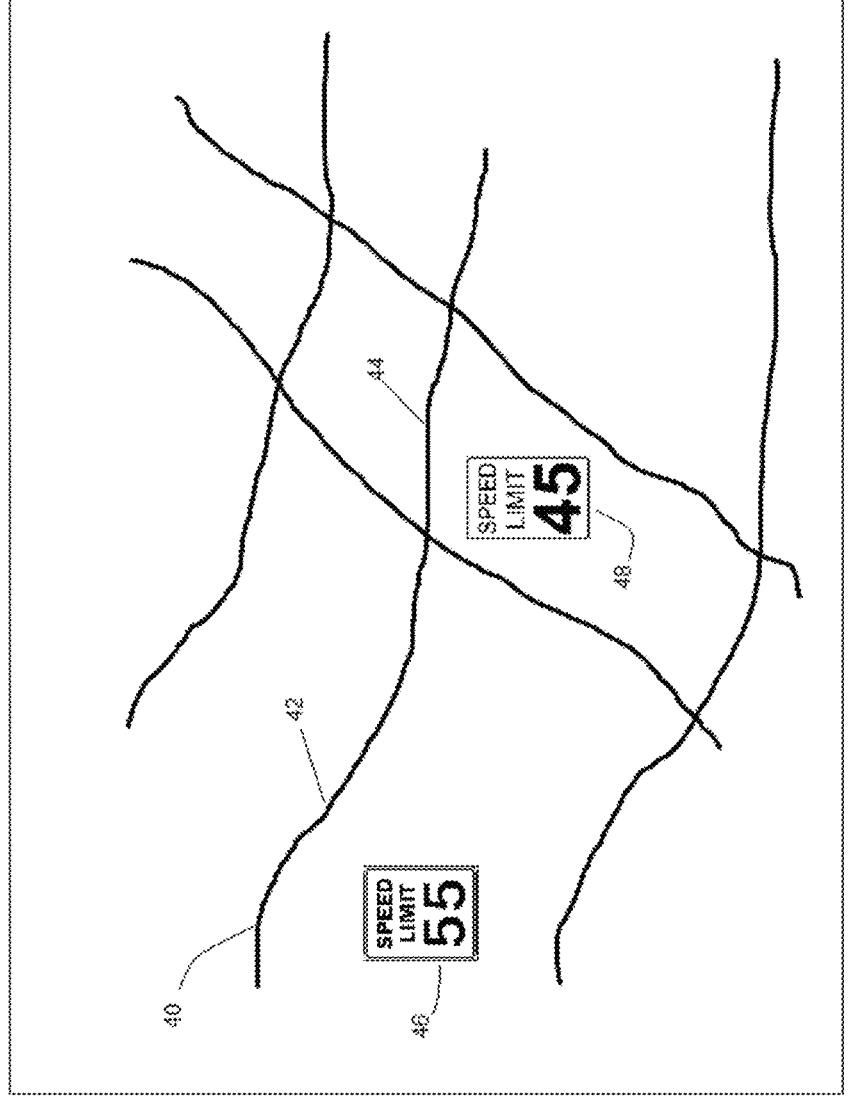
FIG. 2 shows a road to be traversed by the vehicle shown in FIG. 1.

Referring to FIG. 2, a typical roadway 40 along which a vehicle 10 operates includes a first segment 42 and a second segment 44. A first constraint 46 imposes limits on the vehicle's motion within the first segment 42. Similarly, a second constraint 48 imposes limits on the vehicle's motion in the second segment 44.

A typical constraint 46, 48 is a maximum speed. However, certain roadways 40 also specify minimum speeds for vehicles 10 operating thereon. Thus, further examples of constraints 46, 48 include a minimum speed and a band of speeds between a minimum and maximum speed.

Still other examples of constraints 46, 48 include those on the vehicle's direction of travel. For example, a vehicle 10 proceeding in the wrong direction on a one-way street may be traveling below the speed limit but still not be in compliance with a constraint 46, 48.

Yet other examples include a change in the vehicle's direction. For example, certain roadways 40, particularly in hilly areas, have "no passing" zones. In such cases, a constraint 46, 48 would permit changes in the vehicle's direction as needed to follow the roadway 40 but not changes that would result in changing lanes.

It is preferable that the driver 16 operate the vehicle 10 in a manner that complies with the various constraints 46, 48. Referring back to FIG. 1, a warning system 50 assists the user in operating within the constraint 46, 48 corresponding to the particular segment 42, 44. It does so by providing a suitable warning signal 64.

The warning system 50 relies on information concerning the applicable constraint 46, 48. In some embodiments, the warning system 50 uses input from the external camera 26 to identify signage from which it then extracts information concerning the relevant constraint 46, 48. In other embodiments, a GPS 52 maintains a library of constraints 46, 48 for specific locations and uses the vehicle's location to choose the relevant constraint 46, 48, which it then provides to the warning system 50.

The warning system 50 also relies on a motion sensor 54 that provides it with a motion signal 56. The motion signal 56 carries information concerning the vehicle's motion. In some embodiments, the motion signal 56 provides information on the vehicle's speed.

The warning system 50 is further configured to recognize circumstances that require different levels of warning. In particular, the warning system 50 receives the gaze signal 38 from the gaze detector 36 and chooses an escalated warning level upon recognizing that the driver 16 is gazing in a direction other than the neutral direction, i.e., in a "non-neutral direction." For example, if, at the time the warning system 50 decides to issue a warning, the gaze detector 36 observes that the driver 16 is not looking at the instrument panel 28, the warning system 50 will escalate the warning.

Figure 3:
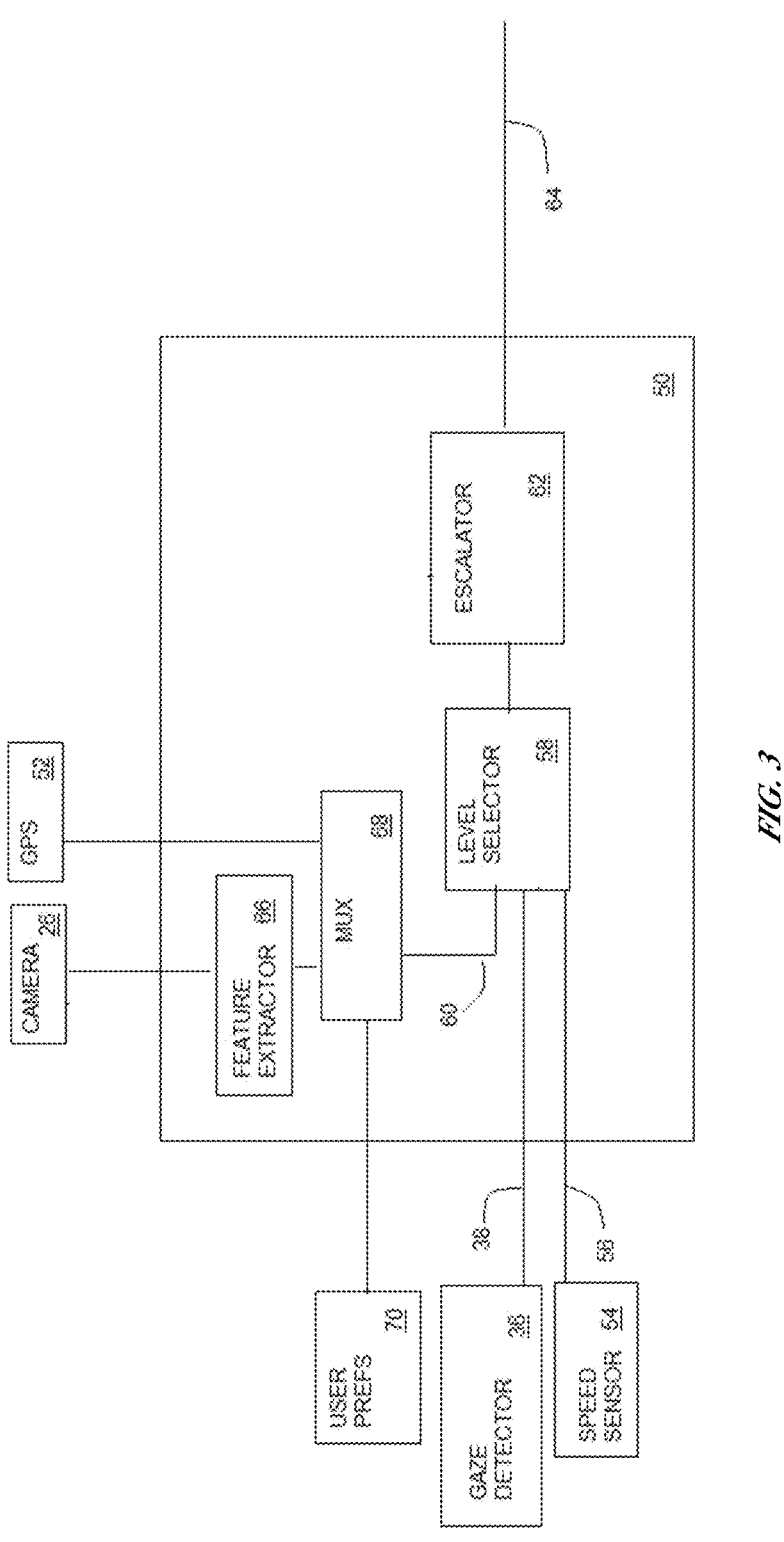
FIG. 3 shows details of a particular embodiment of the warning system shown in FIG. 1.

Referring now to FIG. 3, the warning system 50 features a level selector 58 that receives the gaze signal 38 and the motion signal 56. In addition, the level selector 58 receives a constraint signal 60. The constraint signal 60 indicates the constraint for the section of roadway that the vehicle 10 is driving on. Based on these three inputs, the level selector 58 causes an escalator 62 to output different levels of the warning signal 64.

In some embodiments, the level of escalation depends at least in part on the extent of the driver's lack of compliance with constraints. In such embodiments, driving at speeds that are only slightly above the speed limit will trigger only a small escalation whereas driving at speeds that are considerably in excess of the speed limit will trigger a larger escalation.

Similarly, the nature of the driver's lack of compliance is also relevant to the level of escalation. As an example, the danger that arises from driving in the wrong direction is significantly greater than that of driving over the speed limit. In such cases, it is useful for the escalator 62 to immediately escalate the warning signal 64 to its most obtrusive level.

In some embodiments, a warning matrix stores information indicating the properties of each levels of the warning signal 64. Each row of the warning matrix maps to a particular warning level. For each row, the columns specify the properties of the warning signal 64 at that level. The level selector 58 sets a pointer to a particular row selected is a function of a three-element vector that includes, as elements thereof, information from the constraint signal 60, the motion signal 56, and the gaze signal 38.

The different rows are characterized by different levels of obtrusiveness. The movement of a pointer to a more obtrusive warning signal 64 is referred to as an "escalation." The movement of a pointer to a less obtrusive warning signal 64 is referred to as "de-escalation." As used herein, "obtrusiveness" is a measure of the probability that a driver of ordinary skill in driving would notice the warning signal 64.

In some cases, the level selector 58 determines that the vehicle's motion complies with the constraint 46, 48. In such cases, the level selector 58 provides the escalator 62 with a pointer that causes the escalator 62 to output a null warning signal 64.

A null warning signal 64 is one in which nothing is observable by the driver 16. Accordingly, it is indistinguishable from having no warning signal 64 at all. When the pointer points to the null warning signal 64, only escalation is possible.

In other cases, the level selector 58 determines that the vehicle's motion fails to comply with the constraint 46, 48. In such cases, the gaze signal 38 comes into play.

If the gaze signal 38 indicates that the driver's gaze direction is in the neutral direction, the level selector 58 causes the escalator 62 to escalate the warning signal 64 to a first level of obtrusiveness. An example of a warning signal 64 at this first level is a flashing light on the instrument panel 28.

If, instead, the gaze signal 38 indicates that the driver's gaze direction deviates from the neutral direction, the level selector 58 causes the escalator 62 to escalate the warning signal 64 to a second level of obtrusiveness. This second level is more obtrusive than the first level.

Since the gaze direction is non-neutral, the driver 16 may not be able to actually see the instrument panel 28. As a result, it is useful to combine the light on the instrument panel 28 with an audible alert, such as a spoken utterance. Other examples include those in which the warning signal 64 incorporates a haptic signal. An example of such a haptic signal is one in which the haptic actuator 34 vibrates the steering wheel 32.

In the illustrated embodiment, there are two methods for obtaining the constraint signal 60. The first method comprises receiving the constraint 46, 48 directly from the GPS 52. The second method is to use a feature extractor 66 to receive a signal from the external camera 26 and to extract the relevant constraint 46, 48 from that signal.

Both the signal from the GPS 52 and the signal from the feature extractor 66 are provided to a multiplexer 68. The choice of which to use is made by stored user preferences 70 that are set by a user. In other embodiments, only one or the other method is available, in which case no multiplexer 68 is necessary.

The user preferences 70 also specify other operational details of the warning system 50. For example, by appropriately setting the user preferences 70, it is possible to disable the warning system 50 entirely or to disable the use of the gaze detector 36 to implement the warning system 50. Other settings include the amount of time non-compliant driving is tolerated before a change in the warning signal 64.

This is a useful feature to prevent jitter. Such jitter arises when the vehicle 10 is being driven at an average speed that is equal to the speed limit but with minor variances from that average.

Having described the invention and a preferred embodiment thereof, what is claimed as new and secured by Letters Patent is:

1. A method comprising determining that a vehicle is being operated in a manner that fails to comply with a constraint imposed on motion of vehicles on a section of a road, determining that a driver of said vehicle is gazing in a direction other than a neutral direction, based at least in part on having determined that said driver is gazing in said non-neutral direction, selecting a level of obtrusiveness for a warning message, and outputting said warning message at said level.

2. The method of claim 1, wherein said constraint is a speed limit.

3. The method of claim 1, wherein said level is selected based on an extent to which a direction in which said driver is gazing differs from said neutral direction.

4. The method of claim 1, wherein determining that a driver of said vehicle is gazing in a direction other than said neutral direction comprises making said determination based at least in part on a signal from a camera that is pointing at said driver.

5. The method of claim 1, further comprising determining said constraint based at least in part on observations of signage by an external camera.

6. The method of claim 1, further comprising determining said constraint based at least in part on a GPS signal.

7. The method of claim 1, wherein selecting a level of obtrusiveness for said warning message based at least in part on having determined that said driver is gazing in said non-neutral direction comprises selecting said level based at least in part on said driver having been gazing in said non-neutral direction for a time in excess of a pre-selected threshold.

8. An apparatus comprising a warning system for a vehicle, said warning system comprising an escalator and a level selector, wherein said level selector receives a constraint signal, a motion signal, and a gaze signal, wherein said constraint signal is indicative on a constraint on motion of a vehicle on a section of a road, wherein said motion signal is indicative of motion of said vehicle, wherein said gaze signal is indicative of whether a driver is gazing in a direction other than a neutral direction, wherein said level selector is configured to select a level of obtrusiveness of a warning signal based at least in part on said gaze signal, and wherein said escalator receives said level from said level selector and outputs a warning signal based on said level.

9. The apparatus of claim 8, further comprising a GPS that maintains a library of constraints for specific locations, uses said vehicle's location to choose a constraint from said library, and provides said constraint signal that communicates said constraint to said warning system.

10. The apparatus of claim 8, further comprising a gaze detector that produces a signal that is indicative of an extent to which said driver has deviated from a neutral gaze.

11. The apparatus of claim 8, wherein said warning system further comprises a multiplexer that selects said constraint signal from among a plurality of sources of constraint signals.

12. The apparatus of claim 8, wherein said level selector is further configured to select said level of obtrusiveness based on said deviation from said neutral gaze.

13. The apparatus of claim 8, further comprising user preferences to enable said driver to selectively disable said warning system.

14. The apparatus of claim 8, wherein said level selector is further configured to select said level of obtrusiveness based on an observed pattern in said driver's gaze direction, said pattern comprising two or more instances of said driver gazing in a direction other than said neutral direction.

15. The apparatus of claim 8, further comprising a camera, a GPS that maintains a library of constraints that are keyed to vehicle location and that provides a first constraint signal based on said vehicle's location, user preferences that control operation of said warning system, a motion sensor that provides, to said warning system, indicative of said vehicle's speed to said level selector, and a gaze detector that provides, to said level selector, a signal indicative whether said driver is in a neutral state or in a non-neutral state, wherein said warning system further comprises a feature extractor that extracts constraint information from one or more images provided by said camera and a multiplexer that receives a second constraint signal from said feature extractor and a first constraint signal from said GPS and that chooses which of said first and second constraint signals to provide to said level selector.

16. The apparatus of claim 8, wherein said neutral direction is a direction through a windshield of said vehicle and wherein, in said neutral direction a field-of-view of said driver includes a speedometer of said vehicle and an instrument panel of said vehicle.

17. The apparatus of claim 8, wherein said wherein, during an interval in which said motion of said vehicle fails to comply with said constraint on said motion, said escalator outputs plural warning signals one after the other, the plural warning signals comprising: a flashing light on an instrument panel of said vehicle, an audible alert, a combination of a flashing light on said instrument panel and an audible alert, and a haptic signal.

18. The apparatus of claim 8, wherein said escalator outputs said warning signal only if motion of said vehicle fails to comply with said constraint on said motion.

19. The apparatus of claim 8, wherein, when motion of said vehicle complies with said constraint, a pointer causes said escalator to output a null warning signal.

20. The apparatus of claim 8, wherein said escalator outputs a first warning signal followed by a second warning signal, wherein there exists a probability that said driver will notice said first warning signal, wherein there also exists a probability that said driver will notice said second warning signal, and wherein said probability that said driver will notice said second warning signal exceeds said probability that said driver will notice said first warning signal.

* * * * *